United States Patent [19]
Hotte

[11] Patent Number: 5,934,860
[45] Date of Patent: Aug. 10, 1999

[54] SYSTEM FOR REMOVABLY INSTALLING EQUIPMENTS ON THE FRAME OF A TRUCK

[76] Inventor: Jean-François Hotte, P.O. Box 709, Papineauville, Canada, J0V 1r0

[21] Appl. No.: 08/309,403

[22] Filed: Sep. 20, 1994

[51] Int. Cl.⁶ ............................................. B60P 1/64
[52] U.S. Cl. ................................... 414/500; 414/498
[58] Field of Search ............................. 414/498, 499, 414/500, 538, 559

[56] References Cited

U.S. PATENT DOCUMENTS

| | | | |
|---|---|---|---|
| 2,588,001 | 3/1952 | Holland | 214/85 |
| 2,745,566 | 5/1956 | Bouffrard | 214/585 |
| 2,789,715 | 4/1957 | Filipoff et al. | 414/538 |
| 3,145,009 | 8/1964 | French et al. | 414/498 |
| 3,307,719 | 3/1967 | Martin | 214/85 |
| 3,471,047 | 10/1969 | Burke | 414/500 |
| 3,623,621 | 11/1971 | Tarrant | 414/498 |
| 3,894,515 | 7/1975 | Plyler | 119/82 |
| 4,109,810 | 8/1978 | Jones | 414/500 |
| 4,329,752 | 5/1982 | Forrest | 14/69.5 |
| 4,365,374 | 12/1982 | Bennett | 14/71.7 |
| 4,510,638 | 4/1985 | Alten | 14/71.7 |
| 4,593,424 | 6/1986 | Beck | 14/71.7 |
| 4,673,326 | 6/1987 | Halonen et al. | 414/286 |
| 4,954,039 | 9/1990 | Johnston et al. | 414/500 |
| 4,974,276 | 12/1990 | Alexander | 14/71.3 |
| 5,097,557 | 3/1992 | Salman et al. | 14/71.1 |
| 5,253,410 | 10/1993 | Mortenson | 29/436 |

Primary Examiner—Thomas J. Brahan
Attorney, Agent, or Firm—Goudreau Gage Dubuc & Martineau Walker

[57] ABSTRACT

A system for removably installing a truck equipment onto a truck frame comprises a mechanical support assembly for supporting the equipment on the ground in a tilted position. A tilt ramp pivotally mounted to the rear free end of the truck frame, is provided with a pair of elongate parallel frame rails. The truck equipment comprises a pair of elongate guide members to slide on the frame rails and guide longitudinal movement of the equipment on the ramp. An hydraulic cylinder is mounted between the truck frame and the front end of the ramp to tilt that ramp and thereby enable the guide members to engage the tilted frame rails upon rearward movement of the truck frame toward the truck equipment supported on the ground in the tilted position. A winch then hauls the truck equipment on the tilted ramp until the equipment reaches a predetermined position in which it is locked by means of hydraulically operated pins. The truck equipment is then operable. To remove the truck equipment, the ramp and equipment are tilted and the guide members are unlocked from the frame rails. The rope of the winch is finally uncoiled to slide the tilted truck equipment down the tilted ramp and return that equipment to the tilted position where it can be supported by the mechanical support assembly. The guide members can then be disengaged from the frame rails of the ramp by moving the truck frame forwardly.

10 Claims, 6 Drawing Sheets

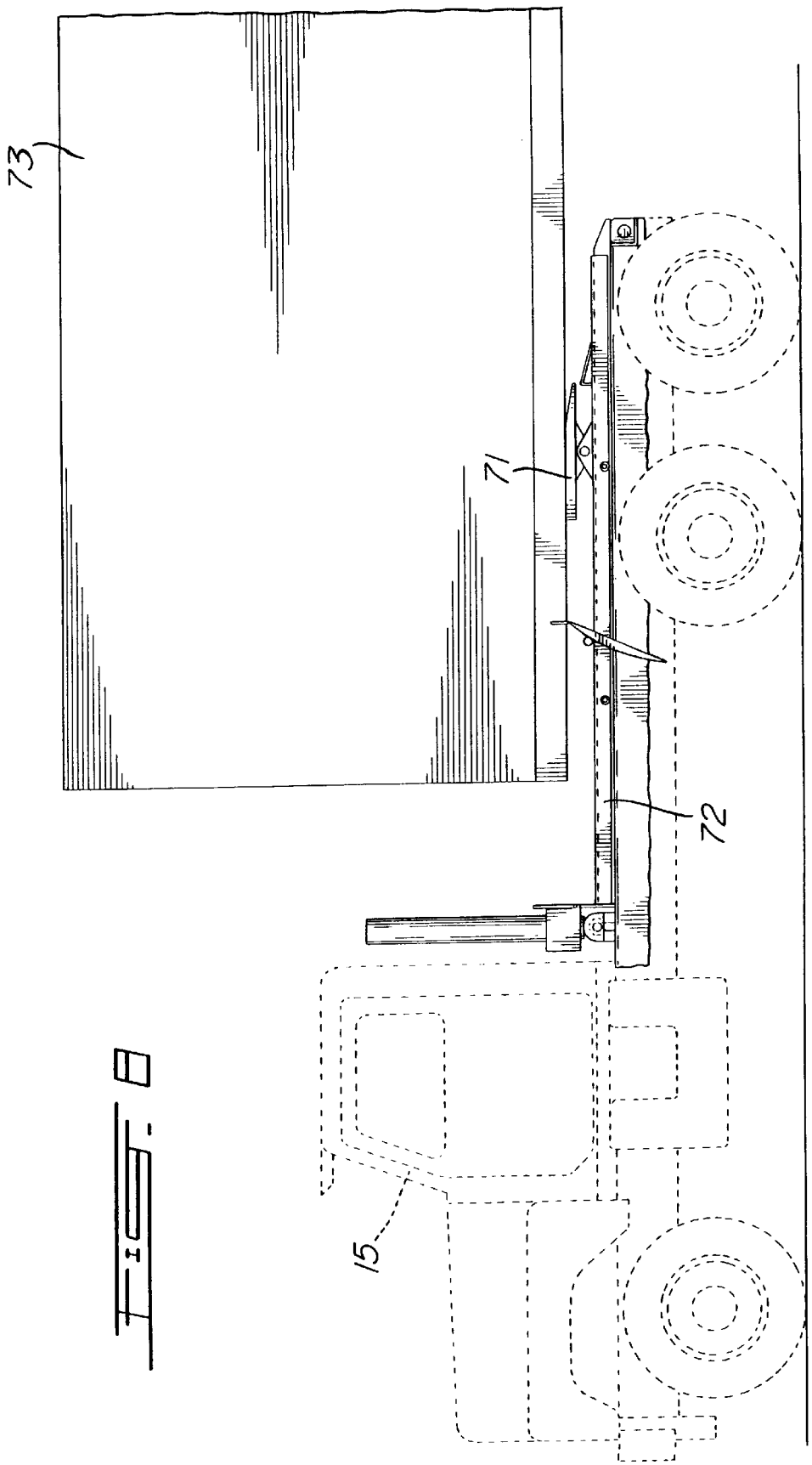

SYSTEM FOR REMOVABLY INSTALLING EQUIPMENTS ON THE FRAME OF A TRUCK

BACKGROUND OF THE INVENTION

1. Field of the Invention

The present invention relates to a system for removably installing any of a plurality of different truck equipments on the frame of a truck, to thereby enable fast and easy change of truck equipment. With that system, a single truck can be used for many purposes.

2. Brief Description of the Prior Art

Presently, truck equipments are permanently installed on the trucks whereby contractors need different trucks for carrying out different purposes. This prevents the contractors to optimize the use of their trucks since each truck can be assigned to only one particular purpose. As the use of the trucks is not optimized, a larger number of trucks is required.

Of course, purchase and maintenance of a larger number of trucks is very expensive and greatly reduce the profits of the contractor.

OBJECTS OF THE INVENTION

An object of the present invention is to overcome the drawbacks of the prior art by providing a system for removably installing any of a plurality of different truck equipments on the frame of a truck, whereby a single truck can be used for many purposes.

SUMMARY OF THE INVENTION

More specifically, in accordance with the present invention, there is provided a system for removably installing a truck equipment onto a truck frame having a longitudinal first axis and a rear free end, comprising:

mechanical support means for supporting the truck equipment on the ground in a tilted position;

tilt ramp means having a longitudinal second axis and being pivotally mounted to the rear free end of the truck frame about a generally horizontal third axis substantially perpendicular to both the first and second axes;

guide means mounted on the truck equipment to engage the ramp means and guide longitudinal movement of the truck equipment on the ramp means;

actuator means for pivoting the ramp means about the third axis to tilt the ramp means and thereby enable the guide means to engage the tilted ramp means upon rearward movement of the truck frame toward the truck equipment supported on the ground in the tilted position;

hauling means for hauling the truck equipment on the tilted ramp means when the guide means engage the tilted ramp means, until the truck equipment reaches a predetermined position; and releasable locking means for locking the truck equipment on the ramp means in the predetermined position in which the truck equipment is operable.

In accordance with a preferred embodiment of the system according to the present invention, the actuator means comprise means for pivoting the ramp means about the third axis to tilt both the ramp means and the truck equipment locked on the ramp means in the predetermined position, the releasable locking means comprise means for unlocking the truck equipment from the ramp means, and the hauling means comprise means for sliding the tilted truck equipment down the tilted ramp means until the truck equipment reaches the tilted position to thereby enable the mechanical support means to support the truck equipment on the ground and the guide means to disengage the ramp means by moving the truck frame forwardly.

In accordance with other preferred embodiments of the system of the present invention:

the truck equipment comprises a rear end and a front end, and the mechanical support means comprise a leg assembly for supporting the front end of the truck equipment above the ground, the rear end of the truck equipment resting on the ground;

the ramp means comprise an elongate tilt frame having first and second longitudinal, parallel lateral frame rails each having a top face and an outer side face;

the truck equipment has an underside and the guide means comprise first and second elongate parallel guide members mounted to the underside of the truck equipment, the first guide member defining interconnected, generally flat longitudinal top and outer side sections to be applied to the top and outer side faces of the first frame rail, respectively, and the second guide member defining interconnected, generally flat longitudinal top and outer side sections to be applied to the top and outer side faces of the second frame rail, respectively;

the top face and the outer side face of each frame rail are perpendicular to each other, and the generally flat longitudinal top section and the generally flat longitudinal outer side section of each guide member are also perpendicular to each other;

the truck equipment comprises a front end remote from the third axis, and the actuator means comprise an hydraulic cylinder mounted between the truck frame and the front end of the truck equipment;

the hauling means comprise a winch installed on the truck frame to haul the truck equipment on the tilted ramp means; p1 the releasable locking means comprise at least one set of first and second axially movable pins, the first pin being inserted into a first pair of coaxial holes made through the outer side face of the first frame rail and the longitudinal outer side section of the first guide member, respectively, and the second pin being inserted into a second pair of coaxial holes made through the outer side face of the second frame rail and the longitudinal outer side section of the second guide member, respectively, for thereby locking the truck equipment on the ramp means; and the first and second pins are coaxial and interconnected by means of an hydraulic cylinder extended to axially spread apart the first and second pins to insert these first and second pins in the coaxial holes of the first and second pairs, respectively and thereby lock the truck equipment on the ramp means, and retracted to axially move the first and second pins toward each other to withdraw the first and second pins from the coaxial holes of the first and second pairs, respectively and thereby unlock the truck equipment from the ramp means.

The present invention also relates to a system for removably installing any of a plurality of truck equipments onto a truck frame having a longitudinal first axis and a rear free end, comprising:

mechanical support means for supporting each truck equipment on the ground in a tilted position;

tilt ramp means having a longitudinal second axis and being pivotally mounted to the rear free end of the truck frame about a generally horizontal third axis substantially perpendicular to both the first and second axes;

guide means mounted on each truck equipment to engage the ramp means and guide longitudinal movement of the truck equipment on the ramp means;

actuator means for pivoting the ramp means about the third axis to tilt the ramp means and thereby enable the guide means of any one of the truck equipments to engage the tilted ramp means upon rearward movement of the truck frame toward the truck equipment supported on the ground in the tilted position;

hauling means for hauling on the tilted ramp means the truck equipment of which the guide means engage the tilted ramp means, until the truck equipment reaches a predetermined position; and releasable locking means for locking the truck equipment on the ramp means in the predetermined position in which the truck equipment is operable; wherein:

the actuator means comprise means for pivoting the ramp means about the third axis to tilt both the ramp means and the truck equipment locked on the ramp means in the predetermined position;

the releasable locking means comprise means for unlocking the truck equipment from the ramp means; and the hauling means comprise means for sliding the tilted truck equipment down the tilted ramp means until the truck equipment reaches the tilted position to thereby enable the mechanical support means to support the truck equipment on the ground and the guide means of the truck equipment to disengage the ramp means by moving the truck frame forwardly.

According to the invention, tilting of both the ramp means and truck equipments greatly facilitate installation and withdrawal of the truck equipment from the truck frame.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 8 is a side elevational view of a system in accordance with the present invention, for removably mounting a fifth wheel onto the frame of a truck.

DETAILED DESCRIPTION OF THE PREFERRED EMBODIMENT

Figure 1:
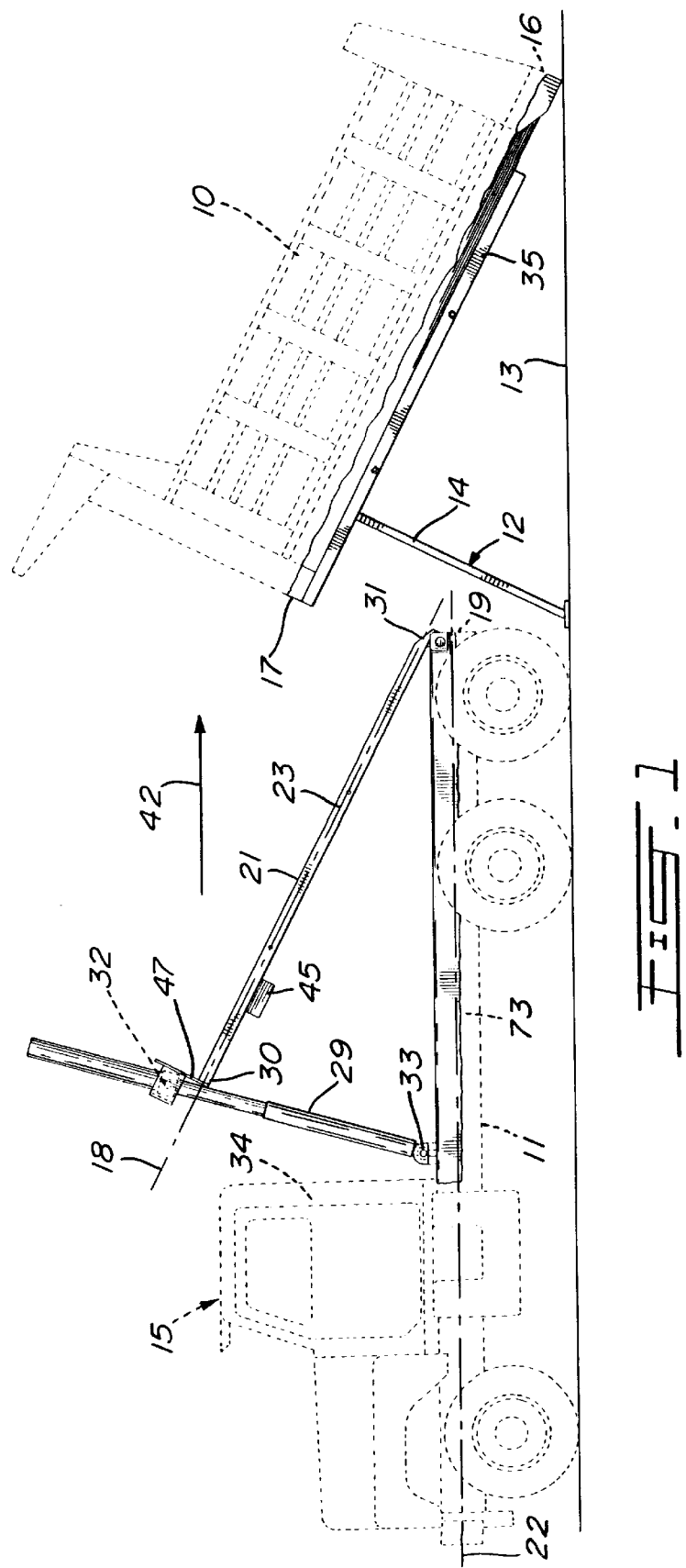
FIG. 1 is a side elevational view of the system in accordance with the present invention, for removably installing a truck equipment onto a truck frame, in which a dump body to be installed on the truck frame is supported on the ground in a tilted position.

Referring to FIG. 1 of the appended drawings, the system in accordance with the present invention for removably installing a truck equipment, for example a dump body 10, onto the frame 11 of a truck 15 comprises a leg assembly 12 for mechanically supporting the dump body 10 on the ground 13 in a tilted position. More specifically, as illustrated in FIG. 1, the rear end 16 of the dump body 10 rests directly onto the ground 13 while the front end 17 of that dump body 10 is supported by the leg assembly 12 at a certain height above the ground 13 to thereby tilt the dump body 10 rearwardly.

The leg assembly 12 comprises a pair of left and right, removable, retractable and/or foldable legs; only the left leg 14 being shown in FIG. 1. For example, the left and right legs may be tubular and mounted into respective tube sections (not shown) welded to the dump body 10. Although an example of leg assembly 14 is given in the drawings and the foregoing description, it is believed to be within the ability of one of ordinary skill in the art to construct mechanical support means capable of supporting the dump body 10 on the ground 13 in the tilted position of FIG. 1.

The system according to the invention further comprises a tilt ramp 21 having a longitudinal axis 18 and a rear end 31 pivotally mounted to the rear free end 19 of the truck frame 11 about a generally horizontal axis 20 (FIGS. 4 and 7) substantially perpendicular to both the longitudinal axis 18 of the tilt ramp 21 and the longitudinal axis 22 of the truck frame 11.

In the example illustrated, the tilt ramp 21 consists of an elongate tilt frame having left and right longitudinal, parallel and lateral frame rails 23 and 24 (FIG. 4) formed of steel tubes square in cross section and having respective horizontal top faces 25 and 26 and respective vertical outer side faces. FIG. 5 shows that the frame rails 23 and 24 rest on the frame rails 73 and 74 of the truck frame 11 when the tilt ramp is horizontal. As can be appreciated, the top face 25 and outer side face 27 of the frame rail 23 are perpendicular to each other, and the top face 26 and outer side face 28 of the frame rail 24 are also perpendicular to each other.

A telescopic hydraulic cylinder 29 is mounted between the truck frame 11 and the front end 30 of the tilt ramp 21 for pivoting rear end 31 of the tilt ramp 21 about the axis 20 to tilt that ramp 21. More specifically, the hydraulic cylinder 29 is mounted to the front end 30 of the tilt ramp 21 through an horizontal pivot 32 perpendicular to the longitudinal axis 18, and the lower end of the hydraulic cylinder 29 is mounted to the truck frame 11 behind the cab 34 through an horizontal pivot 33 perpendicular to the longitudinal axis 22.

The system for removably installing a truck equipment onto a truck frame further comprises left and right elongate parallel guide members 35 and 36 welded longitudinally to the underside of the dump body 10. The left guide member 35 has a right angle cross section to define interconnected, perpendicular and generally flat longitudinal top and outer side sections 37 and 38 to be applied to the top 25 and outer side 27 faces of the left frame rail 23, respectively, and the right guide member 36 has a right angle cross section to define interconnected, perpendicular and generally flat longitudinal top and outer side sections 39 and 40 to be applied to the top 26 and outer side 28 faces of the right frame rail 24, respectively.

To install the dump body 10 being in the tilted position of FIG. 1, the following procedure is followed.

Figure 7:
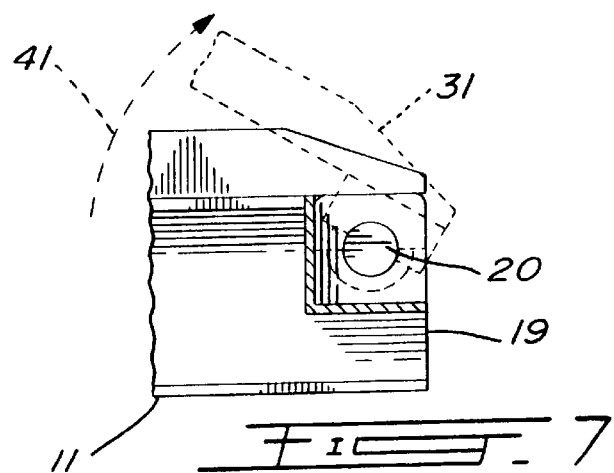
FIG. 7 is a cross sectional view, taken along line 7—7 of FIG. 4, of the pivotal connection between the tilt ramp and the truck frame.

The hydraulic cylinder 29 is first extended to pivot the rear end 31 of the tilt ramp 21 about the axis 20 until that ramp 21 defines with the horizontal the same angle as dump body 10 (see arrow 41 in FIG. 7). The tilt ramp 21 is then in the tilted position of FIG. 1.

Figure 2:
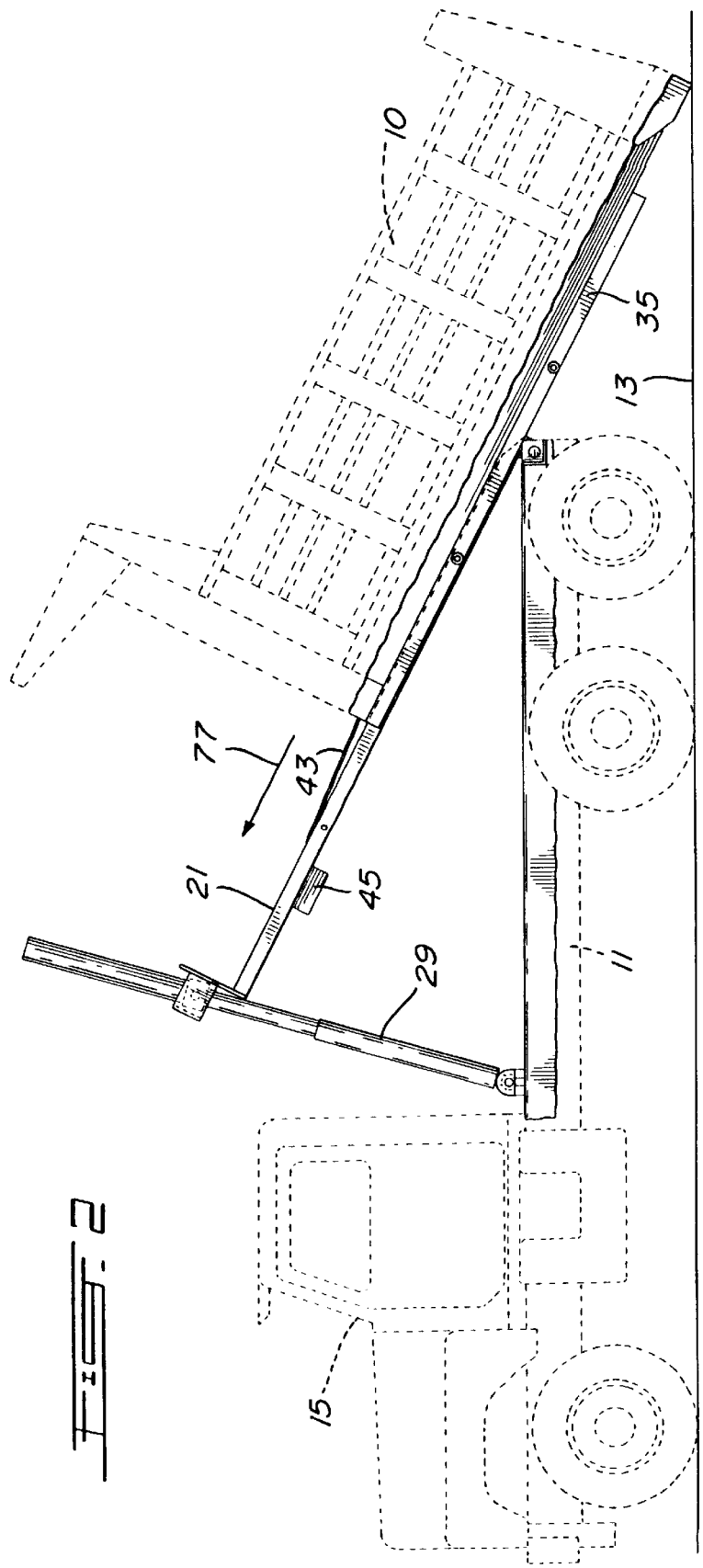
FIG. 2 is a side elevational view of the system of FIG. 1, in which the tilted dump body has underneath guide members engaged with frame rails of a tilt ramp pivotally mounted on the truck frame, the tilted dump body and ramp being tilted at the same angle to enable hauling of the dump body onto the tilt ramp.

The truck 15 is then moved rearwardly (see arrow 42 of FIG. 1) toward the dump body 10 to engage the guide members 35 and 36 with the frame rails 23 and 24, respectively. More specifically, the flat top section 37 of the left guide member 35 is applied to the top face 25 of the left frame rail 23, the flat outer side section 38 of the left guide member 35 is applied to the outer side face 27 of the left frame rail 23, the flat top section 39 of the right guide member 36 is applied to the top face 26 of the right frame rail 24, and the flat outer side section 40 of the right guide member 36 is applied to the outer side face 28 of the right frame rail 24. Those of ordinary skill in the art will appreciate that the guide members 35 and 36 will guide longitudinal movement of the dump body 10 on the frame rails 23 and 24 of the tilt ramp 21. The relative positions of the dump body 10 and tilt ramp 21 are then those of FIG. 2.

The free end 44 of the cable 43 of an hydraulically operated winch 45 installed transversally in between the frame rails 23 and 24 of the tilt ramp 21 substantially at the front of that tilt ramp, is then attached to the underside of the dump body 10 generally at mid-length of that body 10. The leg assembly 12 is then removed and the legs thereof retracted and/or folded and stored onto the truck 15 whereby these legs are available when the dump body 10 is removed from the truck frame 11. The winch 45 is then operated to wind the cable 43 onto a drum 46 thereof and thereby haul the dump body 10 longitudinally onto the tilt ramp 21 (see arrow 77 of FIG. 2 until it reaches the position of FIG. 3 in which the front end 17 of the dump body 10 abuts against a plate 47 welded at the front end 30 of the tilt ramp 21 perpendicularly to the longitudinal axis 18; the flat top section 37 of the left guide member 35, the flat outer side section 38 of this left guide member 35, the flat top section 39 of the right guide member 36 and the flat outer side section 40 of this right guide member 36 then slide longitudinally onto the top face 25 of the left frame rail 23, the outer side face 27 of this left frame rail 23, the top face 26 of the right frame rail 24, and the outer side face 28 of the right frame rail 24.

Figure 4:
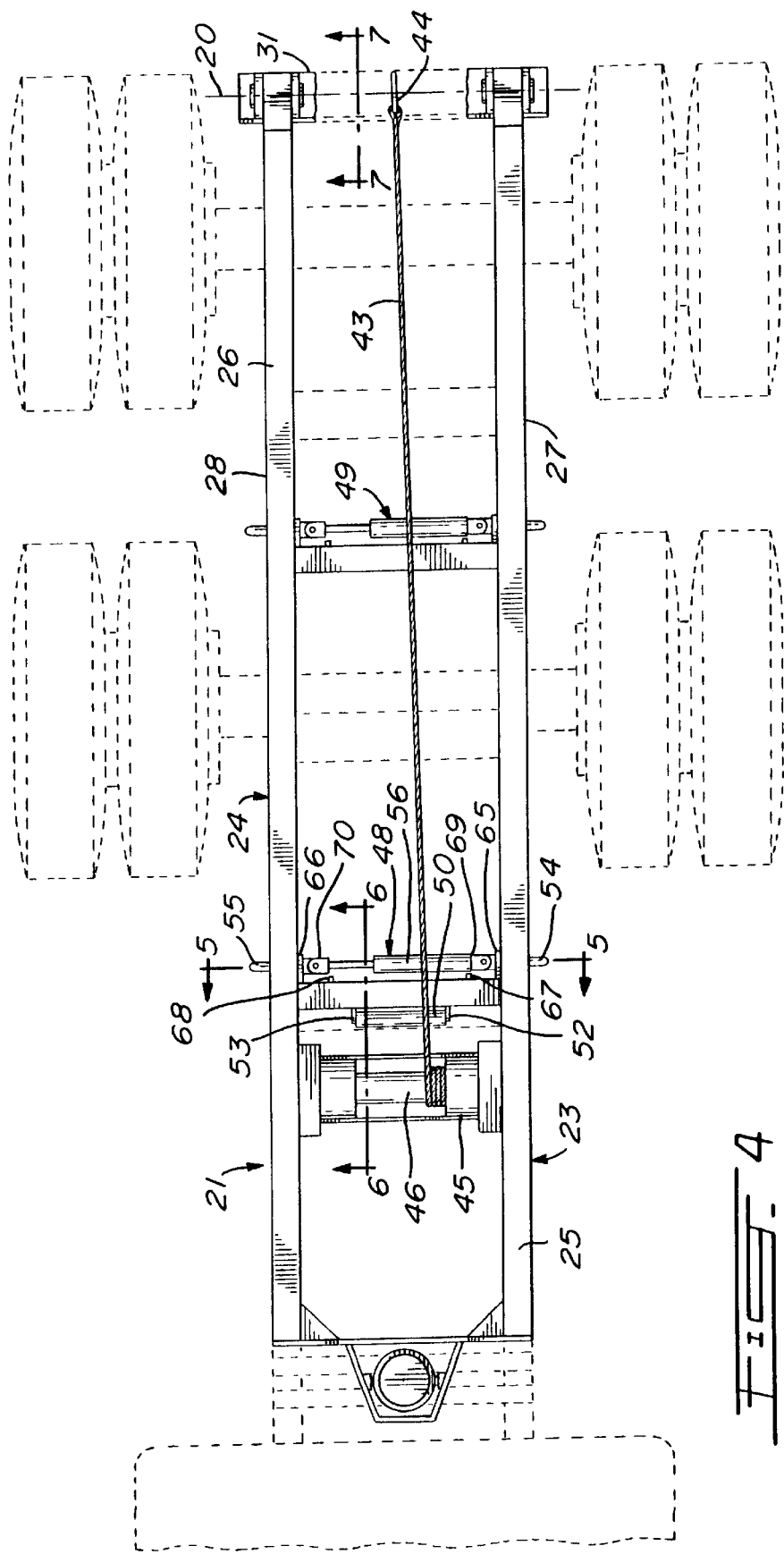
FIG. 4 is a top plan view of the tilt ramp of the system in accordance with the present invention, for removably installing a truck equipment onto a truck frame.
Figure 5:
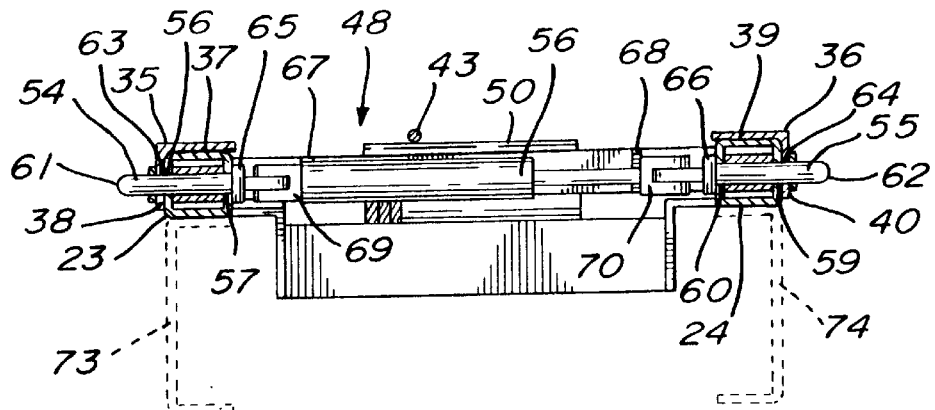
FIG. 5 is a cross sectional view, taken along line 5—5 of FIG. 4, of hydraulically operated pins for locking the dump body, in the position of FIG. 3, on the tilt ramp.
Figure 6:
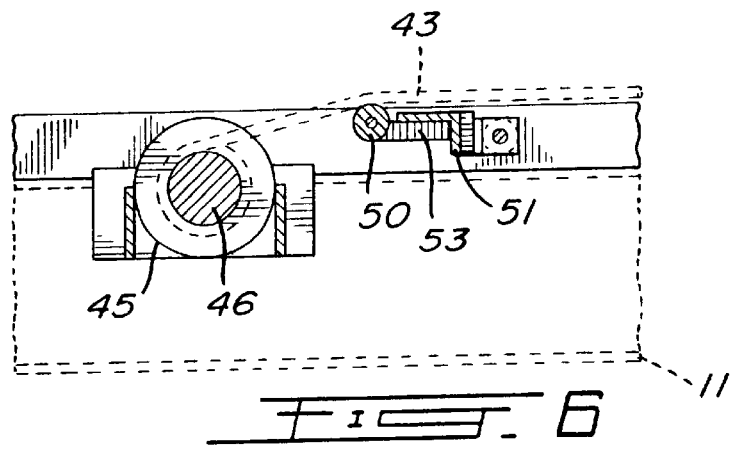
FIG. 6 is a cross sectional view, taken along line 6—6 of FIG. 4, of an hydraulically operated winch apparatus for hauling the dump body on the tilt ramp.

As shown in FIGS. 4 and 6, a small roller 50 is rotatively mounted on the tilt ramp 21 in the proximity of the winch 45, between that winch 45 and the rear end 31 of the ramp 21. More specifically, the roller 50 is mounted onto one 51 of the transverse members that interconnect the two frame rails 23 and 24 together, through a pair of suitable brackets 52 and 53. The cable 43 from the winch 45 applies to the rotatable roller 50 to prevent this cable to rub onto the ramp 21 and therefor premature wearing out of the cable 43.

Figure 3:
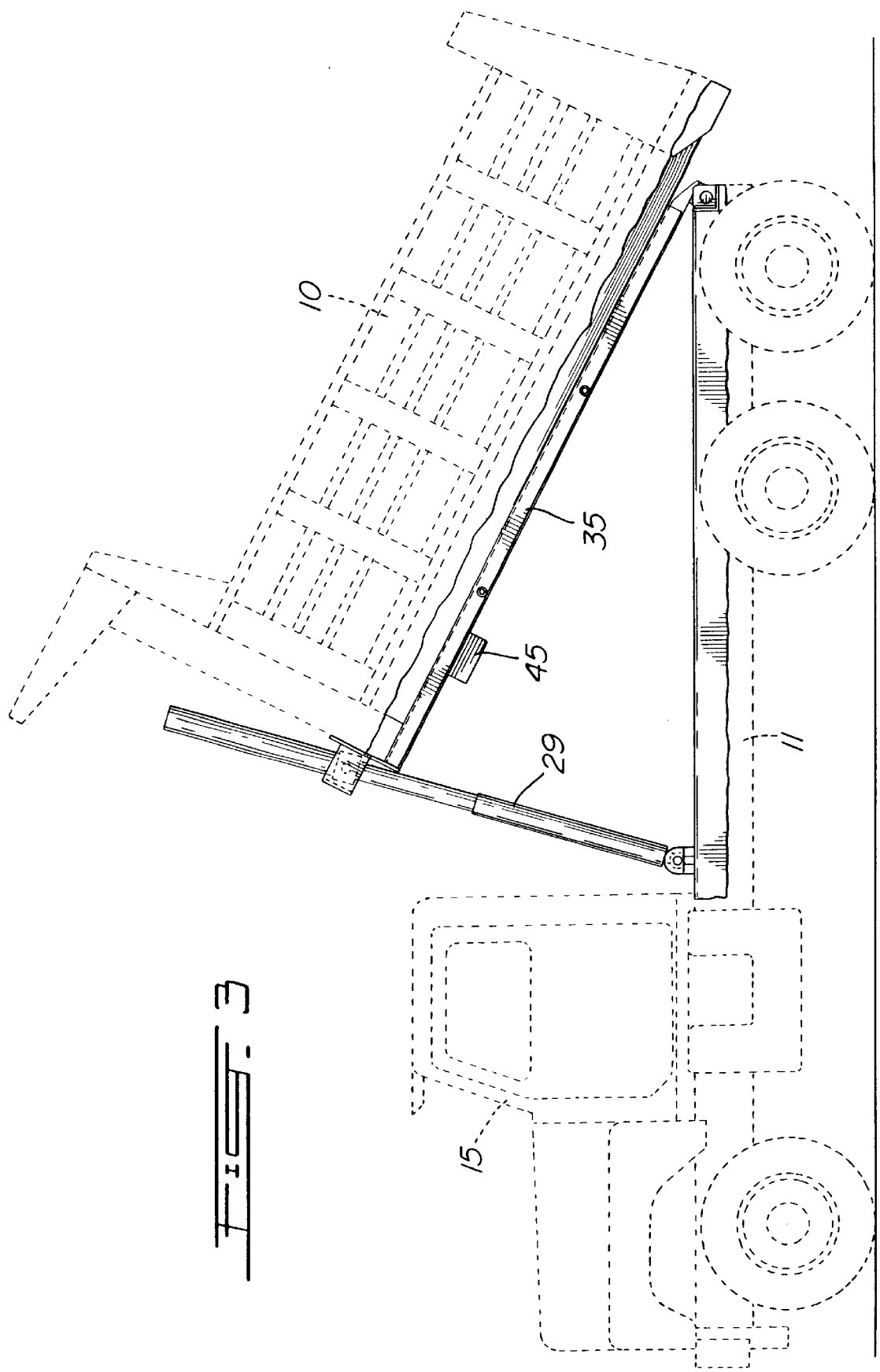
FIG. 3 is a side elevational view of the system of FIGS. 1 and 2, in which the dump body has been hauled onto the tilt ramp.

Finally, the dump body 10 is releasably locked on the tilt ramp in the position of FIG. 3. For that purpose, two sets 48 and 49 of hydraulically operated steel pins (see FIG. 4) are mounted in between the frame rails 23 and 24. As the two sets 48 and 49 of hydraulically operated steel pins are identical, only set 48 will be described hereinafter.

Referring to FIGS. 4 and 5, set 48 comprises coaxial left and right pins 54 and 55 interconnected by means of an hydraulic cylinder 56. The left pin 54 is inserted in a pair of coaxial holes 56 and 57 made in the two vertical walls of the tubular frame rail 23, respectively. In the same manner, the left pin 55 is inserted in a pair of coaxial holes 59 and 60 made in the two vertical walls of the tubular frame rail 24, respectively.

When the dump body 10 is hauled onto the tilt ramp 21, the cylinder 56 is retracted so that the free ends 61 and 62 of the pins 54 and 55 do not extend beyond the outer side faces 27 and 28 of the frame rails 23 and 24, respectively, to thereby enable sliding of the guide members 35 and 36 onto the frame rails 23 and 24.

The outer side sections 38 and 40 of the guide members 35 and 36 are provided with respective holes 63 and 64. In the position of FIG. 3, hole 63 is coaxial with holes 56 and 57 and hole 64 is coaxial with holes 59 and 60. The cylinder 56 is then extended to axially spread apart the pins 54 and 55 until pin 54 extends through the three coaxial holes 56, 57 and 63 and pin 55 extends through the three coaxial holes 59, 60 and 64. This operation is facilitated by the rounded free ends 61 and 62 of the coaxial pins 54 and 55. The guide members 35 and 36 are then locked onto the frame rails 23 and 24 to thereby lock the dump body 10 onto the tilt ramp 21. Therefore, the dump body 10 is releasably locked on the tilt ramp 21 by means of the two pins of the set 48 and the two pins of the set 49.

For loading the dump body 10, the telescopic hydraulic cylinder 29 is retracted to position the body 10 horizontal. For unloading the dump body 101 the telescopic hydraulic cylinder 29 is extended to thereby tilt the interconnected ramp 21 and dump body 10. Accordingly, the dump body 10 can be operated normally for loading and unloading usual materials.

To remove the dump body 10 from the tilt ramp 21, the telescopic hydraulic cylinder 29 is extended to pivot the rear end 31 of the tilt ramp 21 about the axis 20 and thereby tilt both the ramp 21 and dump body 10 in the position of FIG. 3.

The cylinder 56 of each set 48 and 49 is then retracted to axially move the pins 54 and 55 of each set 48 and 49 toward each other and thereby withdraw the pin 54 from the coaxial holes 56 and 63 and the pin 55 from the coaxial holes 59 and 64. The cylinder 56 is retracted until a rectangular plate 65 welded between the pin 54 and the cylinder end 69 of the cylinder 56 abuts against a stopper element 67 welded to the transverse member 51, and a rectangular plate 66 welded between the pin 55 and the piston end 70 of the cylinder 56 abuts against another stopper element 68 also welded to the transverse member 51. The dump body 10 is then unlocked from the tilt ramp 21.

The winch 45 is then operated to unwind the cable 43 from the drum 46. The guide members 35 and 36 slide onto the frame rails 23 and 24 to thereby slide the tilted dump body 10 down the tilted ramp 21 until the dump body 10 reaches the tilted position of FIG. 2. Thereafter, the leg assembly 12 is mounted on the truck body 10 to support that body 10 on the ground 13 in the tilted position of FIG. 1, the free end 44 of the winch cable 43 is detached from the underside of the dump body 10, and the truck 15 is moved forwardly to disengage the ramp guide elements 35 and 36 from the frame rails 23 and 24. The dump body 10 is then removed from the tilt ramp 21 and therefore from the truck frame 11.

Subsequently, the dump body 10 can be reinstalled onto the truck frame 11, or another equipment such as a fifth wheel 71 (FIG. 8) equipped with a pair of guide members such as 72 that can be engaged with the frame rails 23 and 24 of the tilt ramp 21 can be installed on the frame 11 to enable the truck 15 to haul a semitrailer 71.

Those of ordinary skill in the art will appreciate that the system according to the invention enables installation of a great variety of truck equipments on the truck frame 11 to thereby enable optimization of the use of the trucks of a contractor.

Although the present invention has been described hereinabove by way of a preferred embodiment thereof, this embodiment can be modified at will, within the scope of the appended claims, without departing from the spirit and nature of the subject invention.

What is claimed is:

1. A system for removably installing a truck equipment having front and rear ends, onto a truck frame having a longitudinal first axis and a rear end, comprising:

mechanical support means for supporting the truck equipment on the ground in a tilted position, wherein the rear end of the truck equipment rests on the ground and said mechanical support means comprises leg means for supporting the front end of the truck equipment above the ground at a given height whereby said truck equipment is tilted at a given angle;

elongate tilt ramp means having a longitudinal second axis and a front end, and being pivotally mounted to the rear end of the truck frame about a generally horizontal third axis substantially perpendicular to both the first and second axes;

elongate guide means mounted on the truck equipment to engage the ramp means and guide longitudinal movement of the truck equipment on the ramp means;

actuator means for pivoting the ramp means about the third axis to raise the front end of the ramp means and tilt said ramp means substantially at said given angle so as to enable engagement of a lower rear portion of the tilted ramp means with an upper front portion of the guide means by moving the truck frame rearwardly toward the truck equipment, the guide means then occupying a first position on the tilted ramp means;

hauling means for sliding the guide means on the tilted ramp means from said first position until the guide means reaches a second position on the tilted ramp means; and releasable locking means for locking the guide means on the ramp means in said second position in which said truck equipment is operable.

2. A system for removably installing a truck equipment onto a truck frame according to claim 1, wherein:

said actuator means comprise means for pivoting the ramp means about the third axis to tilt both said ramp means and said truck equipment having its guide means locked on the ramp means in said second position;

said releasable locking means are operable to unlock the guide means from the ramp means; and said hauling means comprise means for sliding the tilted truck equipment down the tilted ramp means until said truck equipment reaches said tilted position to thereby enable the mechanical support means to support the truck equipment on the ground and the guide means to disengage the ramp means by moving the truck frame forwardly.

3. A system for removably installing a truck equipment onto a truck frame according to claim 1, in which the ramp means comprise an elongate tilt frame having first and second longitudinal, parallel lateral frame rails each having a top face and an outer side face.

4. A system for removably installing a truck equipment onto a truck frame according to claim 3, wherein said truck equipment has an underside and wherein said guide means comprise first and second elongate parallel guide members mounted to the underside of the truck equipment, the first guide member defining interconnected, generally flat longitudinal top and outer side sections to be applied to the top and outer side faces of the first frame rail, respectively, and the second guide member defining interconnected, generally flat longitudinal top and outer side sections to be applied to the top and outer side faces of the second frame rail, respectively.

5. A system for removably installing a truck equipment onto a truck frame according to claim 4, in which the top face and the outer side face of each frame rail are perpendicular to each other, and wherein the generally flat longitudinal top section and the generally flat longitudinal outer side section of each guide member are also perpendicular to each other.

6. A system for removably installing a truck equipment onto a truck frame according to claim 4, in which said releasable locking means comprise at least one set of first and second axially movable pins, said first pin being inserted into a first pair of coaxial holes made through the outer side face of the first frame rail and the longitudinal outer side section of the first guide member, respectively, and said second pin being inserted into a second pair of coaxial holes made through the outer side face of the second frame rail and the longitudinal outer side section of the second guide member, respectively, for thereby locking the truck equipment on the ramp means.

7. A system for removably installing a truck equipment onto a truck frame according to claim 6, wherein the first and second pins are coaxial and interconnected by means of an hydraulic cylinder extended to axially spread apart the first and second pins to insert said first and second pins in the coaxial holes of the first and second pairs, respectively and thereby lock the guide means on the ramp means, and retracted to axially move the first and second pins toward each other to withdraw said first and second pins from the coaxial holes of the first and second pairs, respectively and thereby unlock the guide means from the ramp means.

8. A system for removably installing a truck equipment onto a truck frame according to claim 1, in which the front end of said truck equipment is remote from said third axis, and in which said actuator means comprise an hydraulic cylinder mounted between the truck frame and the front end of the ramp means.

9. A system for removably installing a truck equipment onto a truck frame according to claim 1, in which said hauling means comprise a winch installed on the ramp means to haul the guide means of the truck equipment on the tilted ramp means.

10. A system for removably installing any of a plurality of truck equipments each having front and rear ends, onto a truck frame having a longitudinal first axis and a rear end, comprising:

mechanical support means for supporting each truck equipment on the ground in a tilted position, wherein the rear end of each truck equipment rests on the ground and said mechanical support means comprises leg means for supporting the front end of each truck equipment above the ground at a given height whereby each truck equipment is tilted at a given angle;

elongate tilt ramp means having a longitudinal second axis and a front end, and being pivotally mounted to the rear end of the truck frame about a generally horizontal third axis substantially perpendicular to both the first and second axes;

elongate guide means mounted on each truck equipment to engage the ramp means and guide longitudinal movement of the truck equipment on the ramp means;

actuator means for pivoting the ramp means about the third axis to raise the front end of the ramp means and tilt said ramp means at said given angle to enable engagement of a lower rear portion of the tilted ramp means with an upper front portion of the guide means of any one of said truck equipments by moving the truck frame rearwardly toward said one truck equipment, the guide means of said one truck equipment then occupying a first position on the tilted ramp means;

hauling means for sliding the guide means of said one truck equipment on the tilted ramp means from said first position until the guide means of said one truck equipment reaches a second position on the tilted ramp means; and releasable locking means for locking the guide means of said one truck equipment on the ramp means in said second position in which said one truck equipment is operable;

wherein:

said actuator means comprise means for pivoting the ramp means about the third axis to tilt both said ramp means and said one truck equipment having its guide means locked on the ramp means in said second position;

said releasable locking means are operable to unlock the guide means of said one truck equipment from the ramp means; and said hauling means comprise means for sliding said one truck equipment down the tilted ramp means until said one truck equipment reaches said tilted position to thereby enable the mechanical support means to support said one truck equipment on the ground and the guide means of said one truck equipment to disengage the ramp means by moving the truck frame forwardly.

* * * * *